United States Patent
Alhof

(10) Patent No.: US 9,834,071 B2
(45) Date of Patent: Dec. 5, 2017

(54) FASTENING ARRANGEMENT FOR MOUNTING A DECORATIVE COVER AND/OR A WINDOW GUIDE ON A VEHICLE DOOR

(71) Applicant: GM GLOBAL TECHNOLOGY OPERATIONS LLC, Detroit, MI (US)

(72) Inventor: Michael Alhof, Flörsheim (DE)

(73) Assignee: GM GLOBAL TECHNOLOGY OPERATIONS LLC, Detroit (*) Notice: Subject to any disclaimer, the term of this patent is extended or adjusted under 35 U.S.C. 154(b) by 0 days.

(21) Appl. No.: 14/995,565

(22) Filed: Jan. 14, 2016

(65) Prior Publication Data

US 2016/0207379 A1    Jul. 21, 2016

(30) Foreign Application Priority Data

Jan. 15, 2015   (DE) .................... 10 2015 000 463

(51) Int. Cl.
| | | |
|---|---|---|
| *B60J 5/04* | (2006.01) | |
| *B60R 13/04* | (2006.01) | |
| *B60R 13/02* | (2006.01) | |

(52) U.S. Cl.
CPC ........... *B60J 5/0468* (2013.01); *B60J 5/0402* (2013.01); *B60R 13/0206* (2013.01); *B60R 13/04* (2013.01); *Y10T 24/44769* (2015.01)

(58) Field of Classification Search
USPC ................................. 24/292–295
See application file for complete search history.

(56) References Cited

U.S. PATENT DOCUMENTS

| | | | | |
|---|---|---|---|---|
| 2,685,473 A | * | 8/1954 | Adell | B60R 13/043 16/85 |
| 2,856,230 A | * | 10/1958 | Adell | B60R 13/043 16/82 |
| 3,208,119 A | * | 9/1965 | Seckerson | F16B 5/06 24/295 |
| 4,275,919 A | * | 6/1981 | Okamoto | B60R 13/0212 24/295 |
| 4,724,585 A | * | 2/1988 | Whitman | B60R 13/04 24/195 |

(Continued)

FOREIGN PATENT DOCUMENTS

| | | |
|---|---|---|
| DE | 7825230 U1 | 12/1978 |
| DE | 4343680 C1 | 5/1995 |

(Continued)

OTHER PUBLICATIONS

Machine translation of FR2609508.*
German Patent Office, German Search Report for German Application No. 102015000463.8, dated Nov. 25, 2015.

*Primary Examiner* — Katherine Mitchell
*Assistant Examiner* — Marcus Menezes
(74) *Attorney, Agent, or Firm* — Lorens & Kopf LLP

(57) ABSTRACT

A fastening arrangement is disclosed for mounting a decorative cover or a window guide on a vehicle door having a material section associated with a decorative cover or a window guide and another material section is associated with a vehicle door. A connector configured as a connection clip connects the material sections. The connection clip positions the material sections in a form-fitting manner relative to one another in at least one direction.

13 Claims, 4 Drawing Sheets

(56) References Cited

U.S. PATENT DOCUMENTS

| | | | | |
|---|---|---|---|---|
| 5,598,609 | A * | 2/1997 | Asami | B60J 1/005 |
| | | | | 24/295 |
| 7,401,994 | B2 * | 7/2008 | Kojima | B62D 25/163 |
| | | | | 24/289 |
| 8,469,438 | B2 * | 6/2013 | Mazur | B60R 13/0206 |
| | | | | 24/293 |
| 8,672,600 | B2 * | 3/2014 | Reznar | E04F 15/04 |
| | | | | 411/457 |
| 8,904,607 | B2 * | 12/2014 | Diez Herrera | B60N 3/026 |
| | | | | 24/292 |
| 2004/0244298 | A1 | 12/2004 | Ogawa et al. | |
| 2011/0148150 | A1 | 6/2011 | Gemdorf et al. | |
| 2012/0091751 | A1 * | 4/2012 | Zimmer | B60J 5/0402 |
| | | | | 296/146.9 |
| 2012/0110918 | A1 * | 5/2012 | Love | B60R 13/04 |
| | | | | 49/502 |
| 2012/0180398 | A1 * | 7/2012 | Priess | B60J 10/081 |
| | | | | 49/493.1 |

FOREIGN PATENT DOCUMENTS

| | | | |
|---|---|---|---|
| DE | 202004006873 U1 | 7/2004 | |
| DE | 102010056385 A1 | 1/2012 | |
| FR | 2609508 A1 * | 7/1988 | B60J 1/20 |

* cited by examiner

FASTENING ARRANGEMENT FOR MOUNTING A DECORATIVE COVER AND/OR A WINDOW GUIDE ON A VEHICLE DOOR

CROSS-REFERENCE TO RELATED APPLICATION

This application claims priority to German Patent Application No. 102015000463.8, filed Jan. 15, 2015, which is incorporated herein by reference in its entirety.

TECHNICAL FIELD

The present disclosure pertains to a fastening arrangement for mounting a decorative cover or a window guide on a vehicle door having a material section associated with a decorative cover or a window guide and another material section associated with a vehicle door.

BACKGROUND

A conventional fastening arrangement is disclosed in DE 2010 050 959 A1. There, a decorative cover is fastened on a vehicle door by means of a connector, which is constructed as a screwed connection. For this, in the course of a pre-installation, a nut element is to be fastened on the vehicle door. For mounting the decorative cover on the vehicle door, a threaded fastener is then screwed by means of a screwing tool fastening the decorative cover against the nut element. Through the pre-installation of the nut element and the screwing process as such this type of fastening is relatively laborious for the installer. Also, a corresponding installation space is to be provided for the nut element, by which the entire fastening arrangement is relatively constructive.

SUMMARY

In accordance with the present disclosure provides a fastening arrangement, which can be realized with less assembly effort than hitherto. Also, the fastening arrangement is relatively compact in structure, in order to be able to be used in the case of a small available installation space. According to an embodiment of the present disclosure, in a fastening arrangement for mounting a decorative cover and/or a window guide on a vehicle door, provision is made that the fastening arrangement has at least two material sections, of which one material section is associated with a decorative cover and/or with a window guide and another material section is associated with a vehicle door. In addition, the fastening arrangement has at least one connector connecting the material sections, in particular connecting with one another.

Provision is made that the connector is constructed as a connection clip, for example as a mechanical connection clip, by which the material sections are positioned in a form-fitting manner relative to one another in at least one direction, in particular are held in a form-fitting manner. Through such a connector, a compact fastening arrangement is realized. The installation space for accommodating a nut element is not necessary in the fastening arrangement. Instead of the screwed connection hitherto, the connection clip now comes into use as connector. Through the connection clip instead of the previous screwing, in addition a simpler and quicker mounting of a decorative cover or respectively window guide on a vehicle door is achieved, because a pre-installing of a nut element and a laborious screwing in of a screwing element into the nut element, for example by means of a corresponding screwing tool, is not necessary. The proposed fastening arrangement is therefore simpler and quicker to realize than hitherto for the installer. In this respect, cost advantages also arise.

The possibility presents itself that the connection clip exerts a clamping force, by which in a least one other direction a movement of the material sections relative to one another is at least counteracted. Through the connection clip, thereby, a movement of the material sections relative to one another is made difficult in the at least one other direction. The at least one other direction, in which the connection clip exerts a or respectively the clamping force, can be a direction in which only small external forces act on the fastening arrangement or in which forces are received, acting through other fastenings which are present, if applicable, or measures which are taken. For example, the at least one other direction in which the connection clip exerts the clamping force is the vertical direction of the vehicle and/or the longitudinal direction of the vehicle. The vertical direction of the vehicle is also designated below as z-direction, and the longitudinal direction of the vehicle as x-direction.

In particular, the longitudinal direction of the vehicle extends substantially along the surface side of the vehicle door in the direction from one vehicle column to another vehicle column, between which the vehicle door can be situated. In particular, the vertical direction of the vehicle extends substantially along the surface side of the vehicle door in the direction from a sill lying at the bottom to a vehicle roof, or vice versa.

By the connection clip positioning the material sections relative to one another in a form-fitting manner in the at least one direction, through the connection clip in this one direction a relatively high force absorption is made possible. For example, this direction is the transverse direction of the vehicle, which is also designated below as the y-direction. In particular, the transverse direction of the vehicle extends substantially orthogonally to the surface side of the vehicle door. It has been found that in this direction on a vehicle door in the region of the vehicle window, which is mounted there, for example on raising and/or lowering the window, relatively high lateral forces act, i.e. forces in the transverse direction of the vehicle. Through the fastening arrangement, allowance is made for these forces accordingly through the form-fitting connection formed by the connection clip.

According to a configuration of the present disclosure, provision is made that the connection clip encompasses the material sections from the exterior, in particular encompasses them jointly. Thereby, a simple mounting of the connection clip on the material sections is made possible, because the installer can arrange the connection clip on the material sections from the exterior. The measure by which according to a further configuration the connection clip is substantially U-shaped and is mounted by pushing onto the material sections, in particular the free ends thereof, aims in the same direction.

The possibility presents itself that the connection clip has two legs, movable in a direction against one another in a spring-elastic manner, which exert a clamping force onto the material sections lying therebetween. Thereby, the connection clip is constructed in a structurally simple manner, such that in the mounted state it can exert a clamping force on the material sections. In so far as the connection clip is constructed substantially in a U-shape, the possibility presents itself that the legs, movable in a spring-elastic manner, are formed by the legs of the U-profile. Thereby, the legs, movable in a spring-elastic manner, are realized in a technically simple manner.

According to a further configuration of the present disclosure, provision is made that the connection clip has at least two projections, of which one projection engages into a depression or opening of one of the material sections and the other projection engages into a depression or opening of the other material section, so that the material sections are positioned, in particular held, relative to one another in a form-fitting manner in at least one other direction. Thereby, by means of the connection clip a fastening of the material sections to one another is achieved, which can likewise receive relatively high forces in the at least one other direction.

In so far as the material section associated with the vehicle door is formed by at least two flange sections of a profile, for example of a frame profile, connected with one another, in a shell construction, the depression can be constructed merely as an opening of one of the two flange sections. Alternatively, the at least two flange sections can have an opening and therefore form a shared passage, into which the one projection of the connection clip can engage or respectively engages. In this case, the connection clip additionally exerts a fastening effect on the shells of the profile, which are connected to one another, by the projection engaging into the opening of both flange sections. The flange sections can be connected to one another by means of welding.

Provision can also be made that one of the flange sections has the depression or opening and the other flange section in the region around the depression or respectively opening has a recess, through which the other flange section does not cooperate with the connection clip.

A further configuration of the present disclosure can consist in that the projections are respectively constructed as a detent element. In particular, the detent elements are then engaged automatically into the associated depressions or openings. Thereby, a simple mounting of the connection clip is also realized with regard to an introducing of the projections into the depression or respectively openings. This is because during the mounting of the connection clip on the material sections, the detent elements can engage automatically into the associated depressions or openings. For example, the detent elements are formed, for this, on the connection clip by material sections standing outwards, movable in a spring-elastic manner, or are constructed on spring-elastic material sections standing outwards.

The possibility presents itself that at least one of the projections is formed on one of the legs of the connection clip. For example, on legs lying opposite one another respectively in a correspondingly opposite position respectively a projection is arranged, in particular formed, on the respective leg.

The connection clip can consist of a metal or can have a metal. For example, the connection clip can be a metal part. Thereby, the connection clip is sufficiently durable and stable. Alternately, provision can also be made that the connection clip consists of a plastic or has a plastic. For example, the connection clip can be a plastic part.

In a further configuration of the present disclosure, the material section associated with the decorative cover and/or with the window guide is formed by a wall of the window guide or is a component of such a wall or adjoins such a wall of the window guide. In particular, the material section is formed on a wall of the window guide. Thereby, the material section is realized in a technically simple manner, because the material section uses the already existing wall and/or an already existing design, and thereby recourse is made to an already realized component. Thereby, installation space is saved.

In a further configuration of the present disclosure, provision is made that the material section associated with the vehicle door is formed by an outwardly projecting wall, in particular flange, of a hollow profile, such as for example a frame profile, for example of the door frame. The hollow profile can be constructed in a shell construction. This measure also aims to use already existing structures and/or components in order to realize thereon the material section of the fastening arrangement, in order to achieve as compact a fastening arrangement as possible.

The possibility presents itself that the material sections lay at least partially in a planar manner against one another. Thereby, together with the fastening clip, a stable and durable interconnection is achieved.

In addition, the possibility presents itself that the material sections are constructed in an elongate manner. Thereby, a stable interconnection together with the fastening clip is achieved over a longitudinal extent, in particular when the fastening clip is at least partially also constructed in an elongate manner and extends in the longitudinal direction of the material sections.

The possibility also presents itself that the material sections extend with their longitudinal extent in vertical direction of the vehicle door. The vertical direction is understood here to mean in particular the z-direction of the motor vehicle. Thereby, the decorative cover and/or the window guide is fastened on the vehicle door in a durable and stable manner in the direction along which the decorative cover or respectively the window guide substantially extends.

Furthermore, the possibility presents itself that the decorative cover and/or the window guide consists of a plastic or has a plastic. For example, the decorative cover and/or the window guide can be a plastic part. Thereby, the decorative cover or respectively the window guide can be realized in a cost-efficient manner and light in weight.

Provision can be made that the decorative cover is a separate component. It can also be that the window guide is a separate component. Furthermore, it can be that the decorative cover and the window guide form a common component.

The vehicle door can consist of a metal or can have a metal. For example, the vehicle door is formed by a metal part. The construction requirements for a vehicle door, in particular for the door body shell, are thereby accommodated.

The present disclosure furthermore includes a motor vehicle with the fastening arrangement described above or with a fastening arrangement of the type described above.

Through the present disclosure, present and existing geometries are used during the fastening of the decorative cover or respectively the window guide on the doorframe. Also, with the fastening clip, a fastening means comes into use, which is conducive with regard to connection. The proposed concept is not package-determinant. A simple mounting in the factory is possible. In so far as the decorative cover and/or the window guide consists of plastic and the vehicle door or respectively the door frame is constructed of metal, by means of the fastening clip within certain limits a thermal expansion can be compensated, without damage occurring to the fastening.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
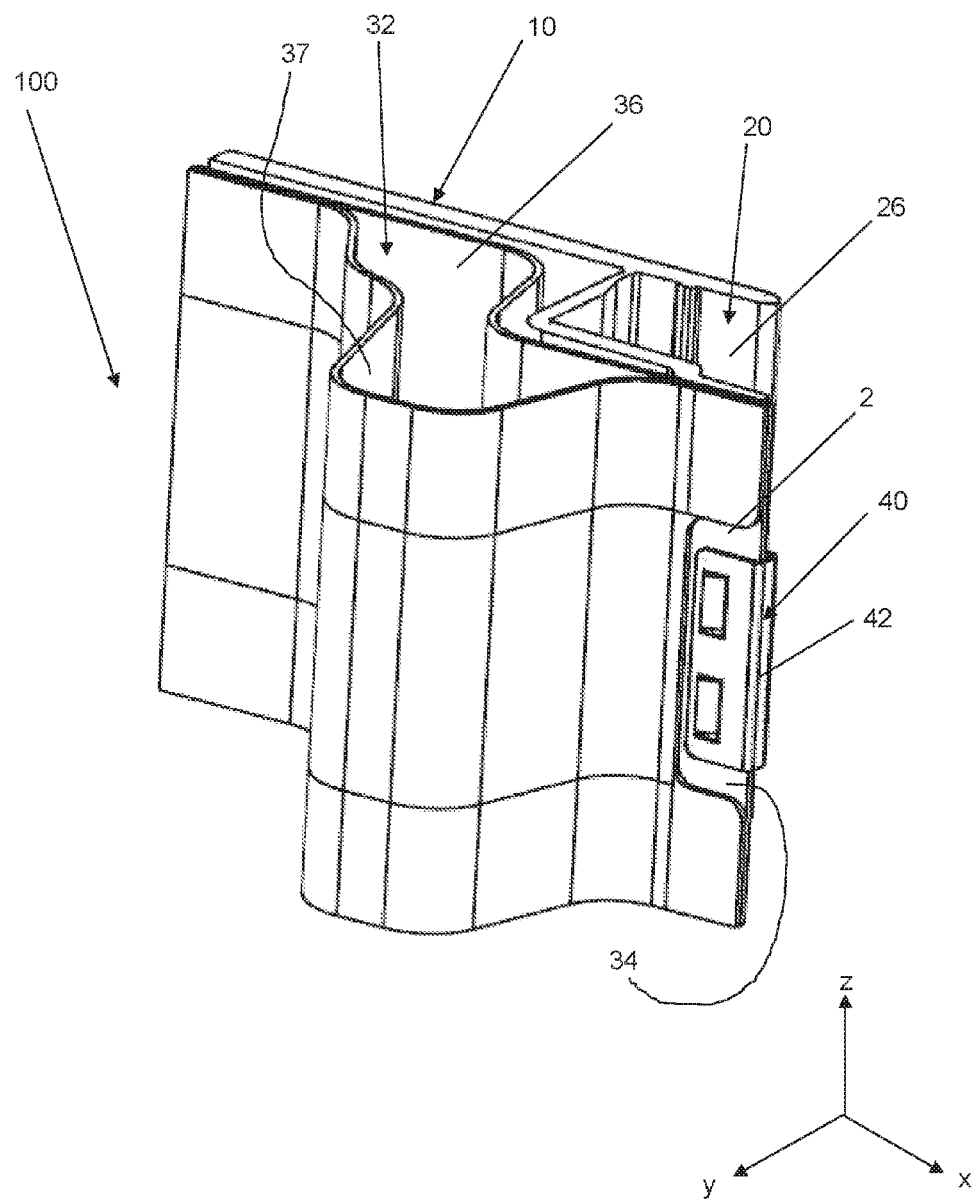
FIG. 1 illustrates an embodiment of a fastening arrangement for mounting a decorative cover and/or a window guide on a vehicle door, in a perspective illustration.
Figure 2:
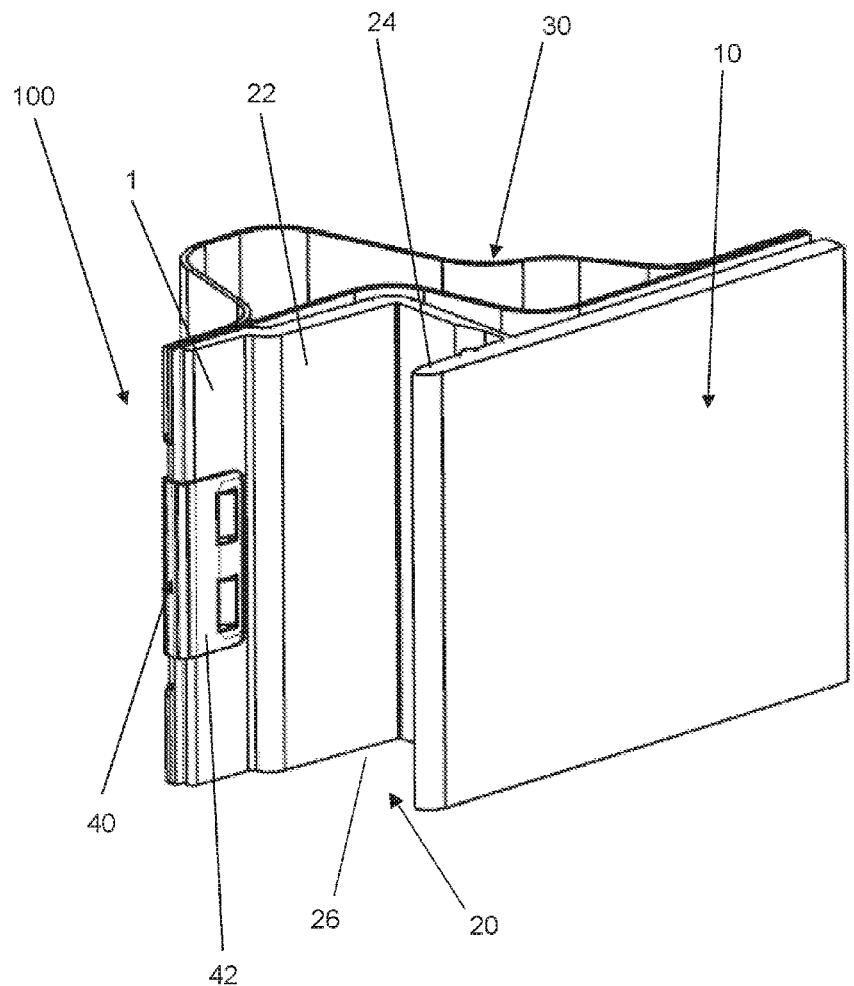
FIG. 2 shows the fastening arrangement according to FIG. 1 in a further perspective illustration.

FIGS. 1 and 2 show—in diagrammatic illustration—an embodiment of a fastening arrangement 100 for mounting a decorative cover and/or a window guide on a vehicle door. The fastening arrangement 100 has two materials sections 1 and 2, of which the one material section 1 is associated with a window guide 20 and the other material section 2 is associated with a vehicle door 30. The fastening arrangement 100 has, in addition, a connector 40, by means of which the material sections 1 and 2 are connected to one another.

The window guide 20 preferably forms a shared component together with a decorative cover 10. The window guide 20 and/or the decorative cover 10 can consist of a plastic or can have a plastic. The decorative cover 10 and the window guide 20 can be formed from a common plastic part.

The vehicle door 30 can be a door body shell as part of the fastening arrangement 100. Also, the part of the vehicle door 30 concerned with the fastening arrangement 100 can be a frame part, in particular a frame profile, which together with further frame parts forms a window frame for a window of the vehicle door 30. The window can be received on the edge side in an opening 26 of the window guide 20 and can be guided on the sidewalls 22 and 24 of the window guide 20. The decorative cover 10 can form at least partially the outside of one of the sidewalls, for example the side wall 24 of the window guide 20.

The material section 2 can be formed by an outwardly projecting wall 34 of a hollow profile 32 for example of the doorframe. For example, the vehicle door 30 or respectively the frame part is constructed as a hollow profile 32, which for example is formed by at least two shells 36 and 37 connected to one another. The material section 2 forms, for example, one of the flange sections of the shells, for example of the shell 36, with which the other shell, for example the shell 37, lies against by means of a corresponding flange section, preferably is connected therewith by means of welding or suchlike fastening method.

Preferably, the shell 37 has a recess in the region of the fastening by means of the connector 40, so that the fastening means 40 interacts preferably only with the flange section of the shell 36, by which the material section 2 is formed. In an alternative configuration, the shell 37 can have a continuous flange section, so that the connector 40 acts against the flange section of the shell 37.

FIGS. 1 and 2 show the vehicle door 30 or respectively the frame part and the window guide 20 only in a cutout. The window guide 20 and the vehicle door 30 or respectively the frame part extends in the direction according to the arrow z upwards, and also downwards. Preferably, the longitudinal extent of the window guide 20 and of the vehicle door 30 is accordingly in the direction in accordance with the arrow z. The direction in accordance with the arrow z forms the vertical direction of the vehicle. The x-direction, illustrated in FIG. 1, corresponds to the longitudinal direction of the vehicle. The y-direction, illustrated in FIG. 1, corresponds to the transverse direction of the vehicle.

Provision is made that the connector 40 is constructed as a connection clip 42. Through the connection clip 42, the material sections 1 and 2 are positioned in a form-fitting manner relative to one another in y-direction. Preferably, for this, the connection clip 42 is mounted by pushing onto the free ends, standing outwards, of the material sections 1 and 2, so that the connection clip 42 encompasses the material sections 1 and 2 from the exterior.

Figure 3:
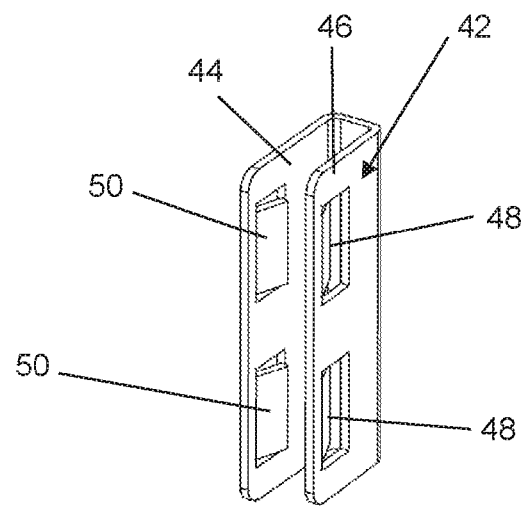
FIG. 3 shows the connector of the fastening arrangement according to FIG. 1, in perspective illustration.

FIG. 3 shows the connection clip 42 as an individual part. The connection clip 42 can be a metal part. For example, the connection clip 42 is constructed substantially in a U-shape with two legs 44 and 46 lying substantially opposite.

The connection clip 42 can be constructed such that the legs 44 and 46 are movable relative to one another. For example, the legs 44 and 46 are movable respectively in a spring-elastic manner. Thereby, it is possible that the connection clip 42, on pushing onto the material sections 1 and 2, is bent slightly apart against the force of the legs 44 and 46, so that the force brought about by the legs 44 and 46 then exerts a clamping force, by which in x-direction and/or in z-direction a movement of the material sections 1 and 2 relative to one another is at least counteracted.

The connection clip 42 can have at least two projections 48 and 50, of which one projection 48 engages into an opening 5 of the material section 1, and the other projection 50 engages into an opening 6 of the material section 2, so that the material sections 1 and 2 are positioned in a form-fining manner relative to one another in a further direction, for example in the x-direction and/or z-direction.

As can be seen from FIG. 3, the projections 48 and 50 can be constructed respectively as a detent element, clip element or suchlike locking element, which is arranged, in particular formed, on the respective leg 44 and 46. For example, the projections 48 and 50 are constructed as material sections movable in a spring-elastic manner, which on pushing 42 onto the free end of the material sections 1 and 2 with the formation of a restoring force are brought away from an initial position and then in a mounting final position of the connection clip 42 automatically engage by their restoring force into the respectively associated opening 5 or respectively 6 on the material section 1 or respectively 2.

The projections 48 and 50 can be arranged lying adjacent to one another respectively at least in pairs. Preferably, the projections 48 and 50 arranged lying adjacent to one another in pairs engage respectively together into the associated opening 5 or respectively 6 of the material section 1 or respectively 2.

Figure 4:
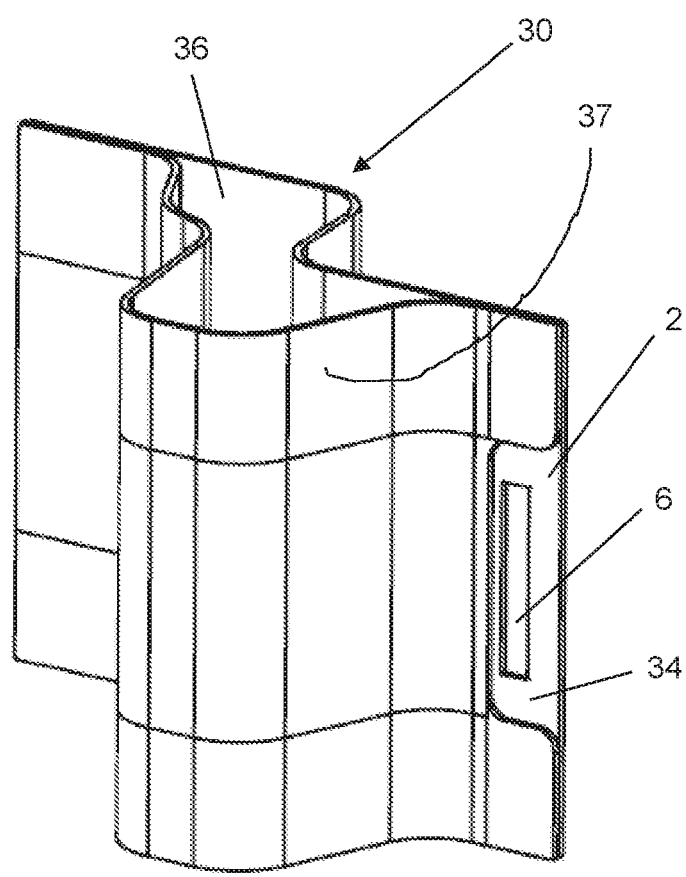
FIG. 4 shows a cutout of the vehicle door of the fastening arrangement according to FIG. 1 in perspective illustration.

FIG. 4 shows the cutout of the vehicle door 30 illustrated alone. The opening 6 of the material section 2 can be seen therefrom. The opening 6 can be formed, for example, by an elongated angular through-opening.

Figure 5:
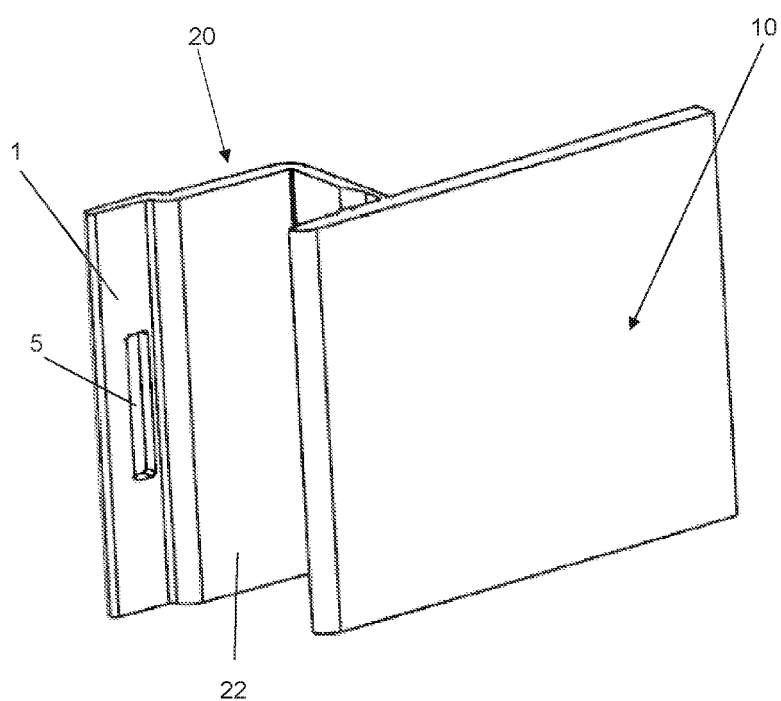
FIG. 5 shows a cutout of a decorative cover with window guide of the fastening arrangement according to FIG. 1, in perspective illustration.

FIG. 5 shows the window guide 20 together with the decorative cover 10, as it comes into use in the fastening arrangement according to FIG. 1. As can be seen therefrom, the material section 1 can adjoin a wall of the window guide 20, for example the wall 22, in particular can be formed thereon. Preferably, the material section 1 is then offset outwards with an offset on the wall 22, so that as far as possible the connection clip 42, the outside of the connection clip, does not project over the guide surface of the side wall 22.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A fastening arrangement for mounting a window guide on a vehicle door frame part, the window guide configured to guide a window, the fastening arrangement comprising:
at least two material sections including a first material section and a second material section, the first material section defining the window guide, the second material section defining the vehicle door frame part, the first material section including a first side wall and a second side wall that are spaced apart to define a space configured to receive the window, the second side wall including a stepped flange, the second material section being formed by a first shell and a second shell that overlap against each other to define a second flange, the first shell including a recess that exposes a portion of the second shell on the second flange; and
a connector connecting the at least two material sections, the connector including a connection clip that engages the portion of the second shell and the stepped flanged, positioning the stepped flange and the second flange against each other in an overlapping, abutting, and form-fitting planar manner.

2. The fastening arrangement according to claim 1, wherein the connection clip exerts a clamping force counteracting a movement of the first material section and the second material section relative to one another.

3. The fastening arrangement according to claim 2, wherein the connection clip comprises at least two projections including a first projection configured to engage a first depression formed in one of the first material section and the second material section and a second projection configured to engage into a second depression formed in the other of the first material section and the second material section, such that the first material section and the second material section are positioned in a form-fitting planar manner.

4. The fastening arrangement according to claim 3, wherein the first projection is constructed as a first detent element configured to automatically engage into the first depression; and
wherein the second projection is constructed as a second detent element configured to automatically engage into the second depression.

5. The fastening arrangement according to claim 2, wherein the connection clip comprises a metal clip.

6. The fastening arrangement according to claim 2, wherein the second material section is included on the vehicle door frame part and is formed by an outwardly projecting wall from a hollow profile of a door frame.

7. The fastening arrangement according to claim 2, wherein the at least two material sections lie at least partially in a planar manner against one another, are constructed in an elongate manner and extend longitudinally in a vertical direction of the vehicle door frame part.

8. The fastening arrangement according to claim 2, wherein the window guide comprises a plastic part.

9. The fastening arrangement according to claim 8, wherein the vehicle door frame part comprises a metal part.

10. The fastening arrangement according to claim 1, wherein the stepped flange includes a first interior surface and a first exterior surface;
wherein the second flange includes a second interior surface and a second exterior surface;
wherein the first interior surface abuts against the second interior surface; and
wherein the connection clip extends about the first exterior surface and the second exterior surface.

11. The fastening arrangement according to claim 1, wherein the connection clip comprises a U-shape member mounted by pushing onto the portion of the second shell and the stepped flange.

12. The fastening arrangement according to claim 11, wherein the connection clip comprises two legs movable in a direction against one another in a spring-elastic manner and configured to exert a clamping force on the portion of the second shell and the stepped flange.

13. A motor vehicle comprising the fastening arrangement according to claim 1.

* * * * *